(12) United States Patent
Isner et al.

(10) Patent No.: US 11,494,816 B2
(45) Date of Patent: Nov. 8, 2022

(54) SECURITY MARKETPLACE WITH PROVIDER VERIFICATION AND REPORTING

(71) Applicant: Axon Enterprise, Inc., Scottsdale, AZ (US)

(72) Inventors: Joshua Isner, Scottsdale, AZ (US); Patrick Madden, Scottsdale, AZ (US); Matthew Morstad, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 176 days.

(21) Appl. No.: 17/020,191

(22) Filed: Sep. 14, 2020

(65) Prior Publication Data

US 2021/0082015 A1  Mar. 18, 2021

Related U.S. Application Data

(60) Provisional application No. 62/899,323, filed on Sep. 12, 2019.

(51) Int. Cl.
  *G06Q 30/06* (2012.01)
  *G06Q 10/02* (2012.01)
  *G06Q 50/26* (2012.01)

(52) U.S. Cl.
  CPC ......... *G06Q 30/0609* (2013.01); *G06Q 10/02* (2013.01); *G06Q 50/265* (2013.01)

(58) Field of Classification Search
  None
  See application file for complete search history.

(56) References Cited

U.S. PATENT DOCUMENTS

| 11,278,818 | B2 * | 3/2022 | Bäcklund | G09B 7/07 |
| 2018/0182179 | A1 * | 6/2018 | Teh | G06Q 50/265 |
| 2018/0357073 | A1 * | 12/2018 | Johnson | G06Q 50/26 |
| 2021/0154586 | A1 * | 5/2021 | Bäcklund | G06Q 10/06398 |

FOREIGN PATENT DOCUMENTS

CA  2914810 A1 *  6/2016  ......... G06K 19/0614

OTHER PUBLICATIONS

Anon., "TeleSign Acquires Routo Telecommunications to Enhance Security and Authentication Solutions," Internet Wire, Feb. 12, 2013. (Year: 2013).*

* cited by examiner

*Primary Examiner* — Nicholas D Rosen
(74) *Attorney, Agent, or Firm* — Justin Powley

(57) ABSTRACT

A system for generating and completing a security task is provided. A security task may be generated by the system based on a security task request. A security task acceptance for the security task may be received at the system. The system may validate the security task acceptance for the security task. The system may transmit a security task acceptance notification in response to validating the security task acceptance. The system may verify an identity of a security provider and generate a report associated with the security provider.

20 Claims, 10 Drawing Sheets

SECURITY MARKETPLACE WITH PROVIDER VERIFICATION AND REPORTING

FIELD OF THE INVENTION

Embodiments of the present invention relate to a security marketplace having security provider verification and reporting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1A:
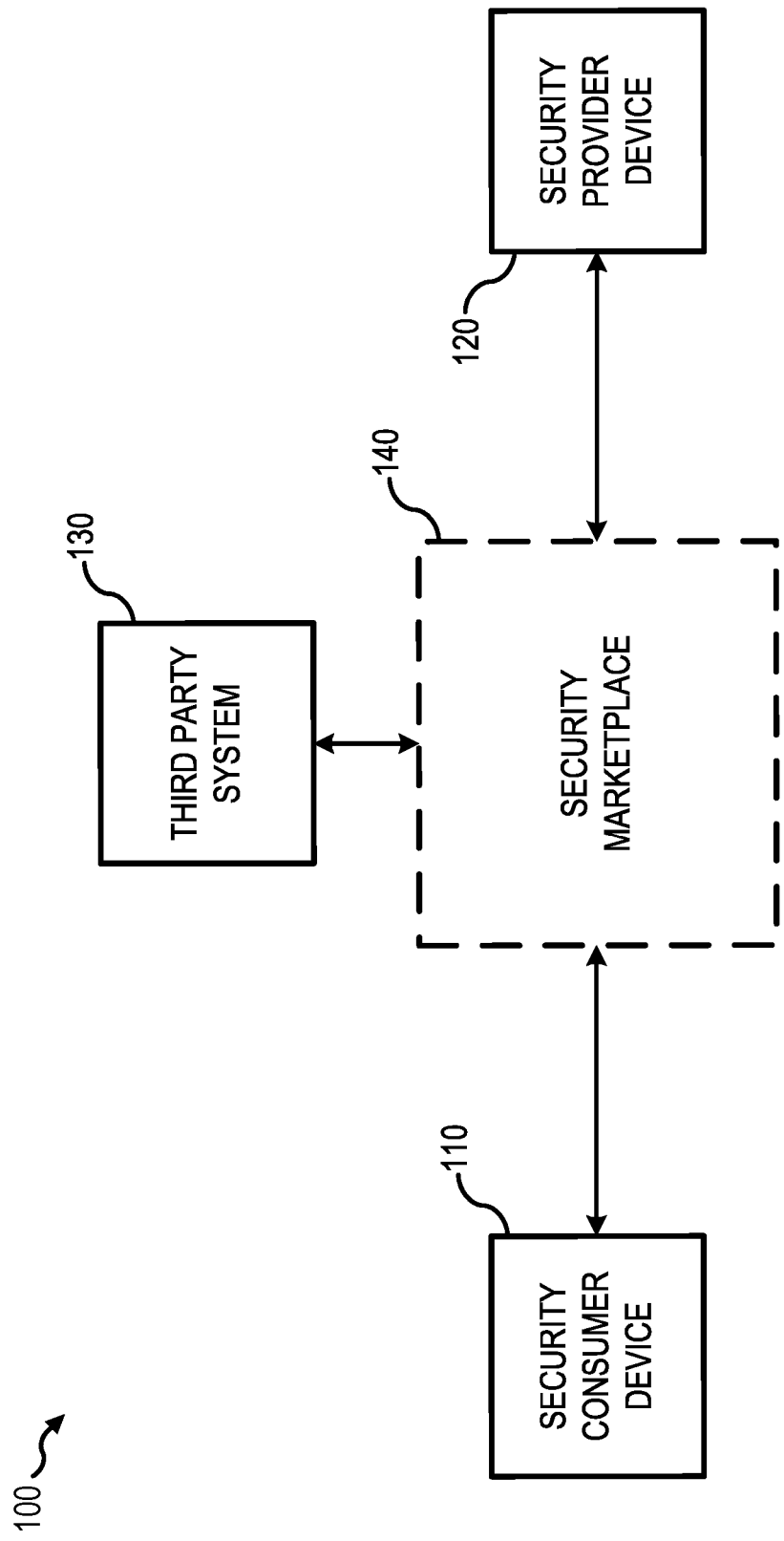
FIG. 1A is a block diagram illustrating system components of a security marketplace, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The systems, methods, and computer readable mediums (collectively, the "system") described herein provide a security marketplace to enable communications between two or more of security consumers, security providers, and third party systems. The security marketplace may be configured to support the generation and completion of security tasks. For example, a security consumer may desire to have a security provider complete a security task. The security marketplace may facilitate the generation and tracking of the security task, the transmission of the security task, completion of the security task, payment for the completion of the security task, and/or reporting of the security task for the security provider, as discussed further herein. The security marketplace may communicate with one or more third party systems to process payments for the security task, verify the identity of consumers, verify the identity of providers, verify task policies providers are subject to, and/or transmit security provider task reports, as discussed further herein.

As discussed herein, a "security consumer" may include any user desiring to have a security task completed by a security provider. As discussed herein, a "security task" may include any service, task, or the like where a security presence in desired. For example, a security consumer may desire to have a security provider for private security, travel security, property security, venue security (e.g., concerts, sporting events, church services, etc.), and/or the like.

As discussed herein, a "security provider" may include any suitable user, agency, service provider, or the like offering security services. For example, a security provider may include an off-duty government employee such as a police officer, a firefighter, or the like. As a further example, a security provider may include a provider of health services, such as an emergency medical technician (EMT), paramedic, ambulance technician, or the like. As a further example, a security provider may include a provider of private security services, such as a security guard or the like.

As discussed herein, a "third party system" may include users, devices, systems, and the like configured to perform various operations for the security marketplace. For example, a third party system may include a police department, a fire station, a government authority, or the like, associated with the security provider. As a further example, a third party system may include a provider of background check services, a consumer credit reporting company, a publicly available database, and/or the like. An exemplary provider of background check services may include BEEN-VERIFIED® offered by BeenVerified, Inc., TRUTH-FINDER® offered by TruthFinder, Inc., INSTANT CHECKMATE® offered by Instant Checkmate, Inc., PEO-PLEFINDERS™ offered by Confi-Chek, Inc., etc. As a further example, a third party system may include a payment processing system, a payment settling system, a bank, a credit union, or the like. In that regard, the third party system may include a traditional payment network or service that presently accommodate transactions for credit cards, debit cards, and/or other types of transaction accounts or transaction instruments (e.g., checking accounts, savings accounts, etc.).

In a practical application, the security provider may be an off-duty police officer. Typically, off-duty police officers are subject to limitations when seeking to provide off-duty security tasks (e.g., a task policy, as discussed further herein). The limitations may be governed by the police department the police officer is employed with, and/or local, state, or Federal government policies. For example, off-duty police officers may be restricted by the amount of time they provide off-duty security tasks on a daily, weekly, monthly, and/or yearly basis (e.g., 20 hours a month, 10 hours a week, 4 hours a day, etc.). Typically, the task policy is enforced via self-reporting by the off-duty police officer and/or manual tracking by a police department. As a result, completion of security tasks may be inaccurately reported or tracked. Inaccurate reporting and/or tracking may lead to the off-duty police officer working an unsafe number of hours off-duty, which may lead to health problems for the police officer and/or create an unsafe environment at the police department or in public. In that regard, the practical application disclosed herein provides a solution to a real, technical problem typically found in reporting, tracking, and enforcing task policies.

In various embodiments, the system further improves the functioning of a computer-based system or network (e.g., security marketplace). For example, by automating communications between a service consumer and a service provider, generation of service tasks, and reporting of completed service tasks, as opposed to needing users to manually input data, communicate between parties, and self-report completed tasks, users in the system perform less computer functions and provide less input, which saves on data storage and memory, thus speeding processing in the computer-based system or network. Additionally, by enabling a central repository responsible for all stages of a security task, the security of the communications between the parties is improved, which decreases the risk of the computer-based system or network, or the data itself, from being compromised.

In various embodiments, the system may further improve the integrity and availability of data. As previously discussed, typically a task policy is enforced via self-reporting by the off-duty police officer and/or manual tracking by a police department. The self-reporting may include manually completing written forms or keeping unorganized notes. The manual completion may be inaccurate. The manually completed written form or notes may be kept in a physical file, although may often also be discarded on an annual basis or otherwise lost. In that respect, the system may improve the integrity and availability of data by maintaining a central repository of data, and by automating and maintaining reporting of completed service tasks.

In various embodiments, and with reference to FIG. 1A, a system 100 for a security marketplace is disclosed. System 100 may comprise one or more of a security consumer device 110, a security provider device 120, a third party system 130, and/or a security marketplace 140. Security marketplace 140 may enable communications between security consumer device 110, security provider device 120, and/or third party system 130, as discussed further herein.

In various embodiments, security consumer device 110 (e.g., a consumer device, a security consumer device, etc.) may be configured to allow a security consumer to interact with security marketplace 140, initiate the generation of one or more security tasks, and perform additional operations as discussed further herein. Security consumer device 110 may be in electronic communication with security marketplace 140. In various embodiments, security consumer device 110 may also be in electronic communication with security provider device 120. Security consumer device 110 may comprise any combination of hardware and/or software components. For example, security consumer device 110 may comprise hardware such as a processing unit, a communications unit, a memory unit, an input device, and/or an output device. Security consumer device 110 may also comprise software configured to manage and/or interact with the hardware components, such as, for example, an operating system, user interfaces, software applications, and/or the like. For example, security consumer device 110 may be a computing device such as a server, a computer-based system, a portable computer-based system (e.g., a laptop, a notebook, a hand held computer, a tablet, a personal digital assistant, etc.), a cellular phone, a smart phone (e.g., IPHONE®, BLACKBERRY®, ANDROID®, etc.), a wearable device (e.g., a smart watch, smart glasses, etc.), an internet of things (IoT) device, and/or any other device capable of transmitting and/or receiving data over a network.

Figure 2A:
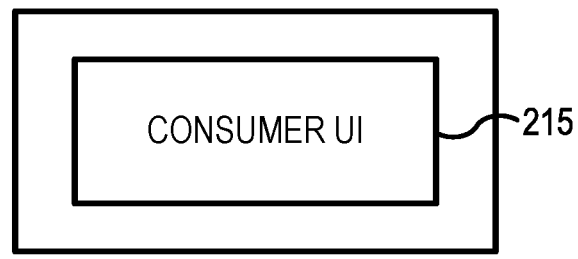
FIG. 2A is a block diagram of an exemplary security consumer device for use with a security marketplace, in accordance with various embodiments.

In various embodiments, and with reference to FIG. 2A, a security consumer device 110 may comprise a consumer user interface (UI) 215. Consumer UI 215 may be configured to allow security consumer device 110 to interact with security marketplace 140 (with brief reference to FIG. 1A). Consumer UI 215 may comprise software, a mobile application, a web interface, or the like. Consumer UI 215 may comprise a graphical user interface configured to allow the security consumer to input and view data. In various embodiments, consumer UI 215 may be hosted by security marketplace 140 (with brief reference to FIG. 1A) and/or via a web server. In various embodiments, consumer UI 215 may comprise a standalone software application installed on security consumer device 110.

In various embodiments, and with reference again to FIG. 1A, security provider device 120 (e.g., a provider device, a security provider device, etc.) may be configured to enable a security provider to interact with security marketplace 140, accept and complete one or more security tasks, and perform additional operations as discussed further herein. Security provider device 120 may be in electronic communication with security marketplace 140. In various embodiments, security provider device 120 may also be in electronic communication with security consumer device 110 and/or third party system 130. Security provider device 120 may comprise any combination of hardware and/or software components. For example, security provider device 120 may comprise hardware such as a processing unit, a communications unit, a memory unit, an input device, and/or an output device. Security provider device 120 may also comprise software configured to manage and/or interact with the hardware components, such as, for example, an operating system, user interfaces, software applications, and/or the like. For example, security provider device 120 may be a computing device such as a server, a computer-based system, a portable computer-based system, a cellular phone, a smart phone, a wearable device, an internet of things (IoT) device, and/or any other device capable of transmitting and/or receiving data over a network.

In various embodiments, a security provider device 120 may also comprise (or be in communication with) equipment or other devices carried by the security provider. For example, and with reference to FIG. 1B, a security provider device 120 may comprise or be in communication with one or more secondary security provider devices, such as a first secondary security provider device 122-1 and a second secondary security provider device 122-2. In that respect, a security provider may have a plurality of security provider devices.

A secondary security provider device may comprise any device carried by or under control of the security provider that is in communication with security provider device 120 and/or security marketplace 140. For example, one or more secondary security provider devices may be in electronic communication with (the primary) security provider device 120. One or more secondary security provider devices may be in electronic communication with security marketplace 140. One or more secondary security provider devices may be in electronic communication with each other.

In various embodiments, a secondary security provider device may comprise a camera or series of cameras, such as, for example, a home security system (e.g., a surveillance camera), a drone, a body-worn camera, or the like. In that regard, the secondary security provider device may be configured to capture images, videos, and/or audio data. The secondary security provider device may include one or more cameras and/or microphones configured to capture the images, videos, and/or audio data. In various embodiments, a secondary security provider device may comprise a weapon or electronic device such as a conducted electrical weapon (CEW).

In various embodiments, a secondary security provider device may be assignable and unique to one or more security providers. For example, a secondary security provider device may be associated with a unique identifier (e.g., a unique number, alphanumeric string, MAC address, etc.). In response to a security provider being assigned or provided the secondary security provider device, system 100 may assign and associate the secondary security provider device with the security provider. For example, security marketplace 140 may associate the unique identifier of the secondary security provider device with a provider identifier associated with the security provider. Security marketplace 140 may store the association in a provider profile associated with the security provider, as discussed further herein.

Figure 1B:
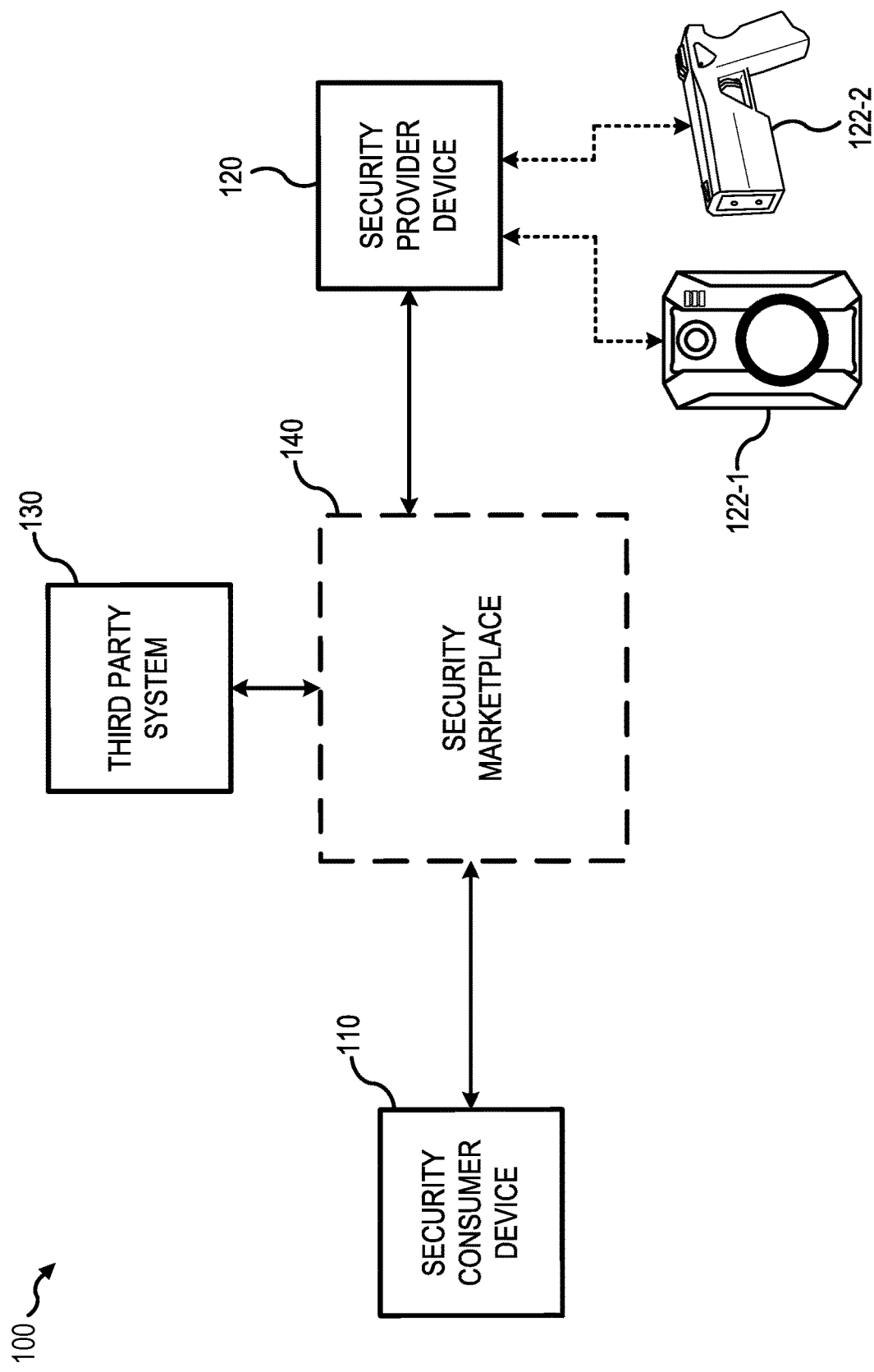
FIG. 1B is a block diagram illustrating system components of a security marketplace into secondary security provider devices, in accordance with various embodiments.

In various embodiments, in a practical application the service provider may be an off-duty law enforcement officer. A secondary security provider device may comprise a body worn camera (e.g., secondary security provider device 122-1, as depicted in FIG. 1B) and/or a CEW (e.g., secondary security provider device 122-2, as depicted in FIG. 1B). Security provider device 120 may comprise a computer-based system, such as a smart phone. Security provider device 120 may be in electronic communication with one or more of secondary security provider devices 122-1, 122-2. Security provider device 120 may be configured to instruct, transmit data to, receive data from, and/or provide communications capabilities to one or more of secondary security provider devices 122-1, 122-2.

For example, security provider device 120 may instruct secondary security provider device 122-1 to begin recording video and/or audio, or to stop recording video and/or audio. Security provider device 120 may receive recorded video and/or audio data from secondary security provider device 122-1 and may transmit (e.g., upload, stream, etc.) the recorded video and/or audio data to security marketplace 140 (and/or directly to security consumer device 110).

As a further example, security provider device 120 may receive an activation signal from secondary security provider device 122-2. In that regard, secondary security provider device 122-2 may be configured to transmit the activation signal in response to secondary security provider device 122-1 being drawn from a holster, activated to deploy projectiles, and/or response to any other suitable or defined event. In response to receiving the activation signal, security provider device 120 may instruct secondary security provider device 122-1 to begin recording video and/or audio data. Security provider device 120 may receive recorded video and/or audio data from secondary security provider device 122-1 and may transmit (e.g., upload, stream, etc.) the recorded video and/or audio data, and/or data regarding the activation signal, to security marketplace 140 (and/or directly to security consumer device 110).

Figure 2B:
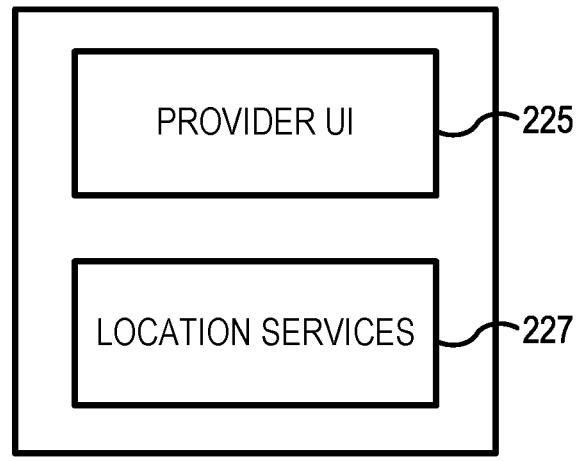
FIG. 2B is a block diagram of an exemplary security provider device for use with a security marketplace, in accordance with various embodiments.

In various embodiments, and with reference to FIG. 2B, a security provider device 120 may comprise a provider user interface (UI) 225 and/or location services 227. In various embodiments, security provider device 120 may further comprise a camera configured to digitally capture an image (e.g., a static image, a video, etc.) from outside security provider device 120, a microphone configured to capture audio from outside security provider device 120, and/or a speaker configured to output audio.

Provider UI 225 may be configured to allow security provider device 120 to interact with security marketplace 140 (with brief reference to FIG. 1A). Provider UI 225 may comprise software, a mobile application, a web interface, or the like. Provider UI 225 may comprise a graphical user interface configured to allow the security provider to input and view data. In various embodiments, provider UI 225 may be hosted by security marketplace 140 (with brief reference to FIG. 1A) and/or accessible via a web server. In various embodiments, provider UI 225 may comprise a standalone software application (e.g., software application, mobile application, etc.), installed on security provider device 120.

Location services 227 may comprise software and/or hardware components on security provider device 120. Location services 227 may be configured to provide location details for security provider device 120. For example, location services 227 may comprise an onboard global positioning system (GPS) which provides location (e.g., coordinates) of security provider device 120. Location service 227 may also comprise a compass which provides a direction of view or movement of security provider device 120, and/or an accelerometer which may detect a speed and/or acceleration of movement of security provider device 120. Collectively, the information collected by location services 227 may be referred to as "location information." Location services 227 may also comprise tools, software, and the like configured to gather, associate, store, and/or transmit the location information.

In various embodiments, and with reference again to FIG. 1A, third party system 130 may be configured to enable a third party to interact with security marketplace 110. Third party system 130 may be in electronic communication with security marketplace 110. Third party system 130 may also be in electronic communication with security provider device 120. Third party system 130 may comprise any combination of hardware and/or software components. For example, third party system 130 may comprise hardware such as a processing unit, a communications unit, a memory unit, an input device, and/or an output device. Third party system 130 may also comprise software configured to manage and/or interact with the hardware components, such as, for example, an operating system, user interfaces, software applications, databases, and/or the like. For example, third party system 130 may be a computing device such as a server, a computer-based system, a portable computer-based system, a cellular phone, a smart phone, a wearable device, an internet of things (IoT) device, and/or any other device capable of transmitting and/or receiving data over a network.

Figure 2C:
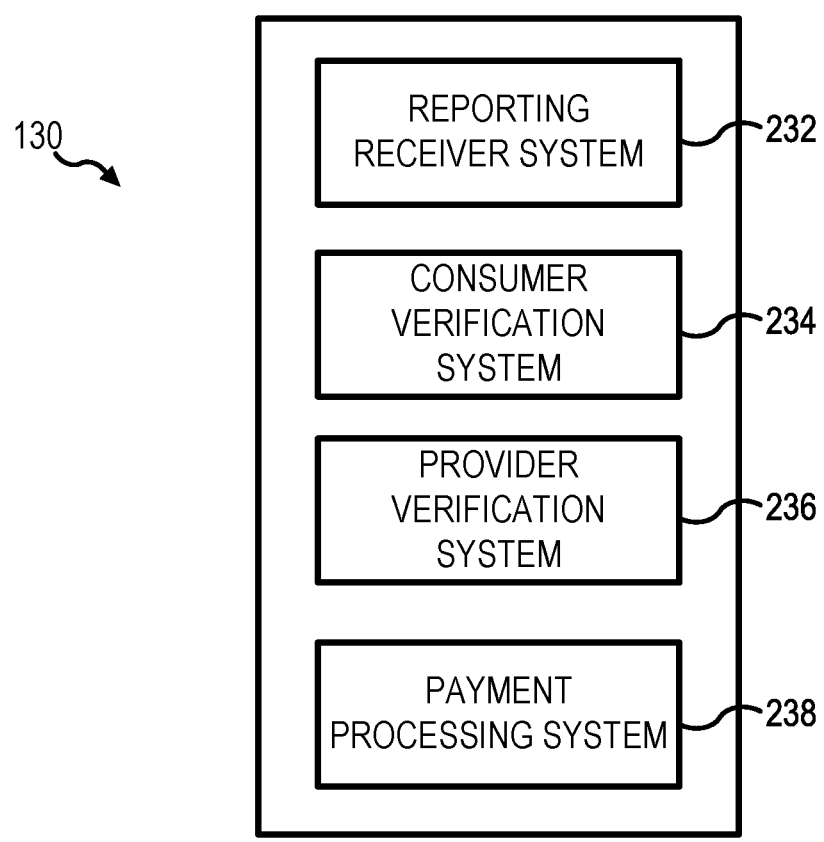
FIG. 2C is a block diagram of an exemplary third party system for use with a security marketplace, in accordance with various embodiments.

In various embodiments, and with reference to FIG. 2C, a third party system 130 may comprise a reporting receiver system 232, a consumer verification system 234, a provider verification system 236, and/or a payment processing system 238. In various embodiments, system 100 may comprise one or more third party systems 130 associated with each of the above systems (e.g., separate reporting receiver system 232, consumer verification system 234, provider verification system 236, payment processing system 238, etc.). In various embodiments, one or more of the third party systems 130 may also comprise one or more of the above systems. For example, a third party system 130 may comprise consumer verification system 234 and provider verification system 236 (e.g., a background check system). As a further example, a third party system 130 may comprise a reporting receiver system 232 and a provider verification system 236 (e.g., a police department system). Each system 232, 234, 236, 238 may comprise any combination of hardware, software, and/or database components described herein.

Reporting receiver system 232 may be configured to receive and/or process security task provider reports received from security marketplace 140 (with brief reference to FIG. 1A). For example, reporting receiver system 232 may be at a police department, fire station, government agency building, or the like, or accessible by the police department, fire station, government agency building, or the like. Each security task provider report may be associated with a security provider. The security task provider report may comprise data of security tasks completed by the security provider, such as, for example, a task title, a task description, a task location, a task date, a task time, a total task time (e.g., weekly, monthly, etc.), etc. Reporting receiver system 232 may be configured to compare the security task provider report against a security task policy to determine whether the security provider is in violation of the security task policy (e.g., a total task time of 20 hours in a month would violate a security task policy specifying a maximum of 15 hours in a month).

Consumer verification system 234 may be configured to provide verification services for a security consumer. Consumer verification system 234 may provide the verification services during a consumer registration, and/or at any other time during the lifecycle of a security consumer's active registration. For example, consumer verification system 234 may be configured to verify consumer data (e.g., name, address, telephone number, employment data, etc.). As used herein, verifying consumer data may include verifying that the consumer data is complete and/or accurate, and/or providing background check services based on the consumer data. Consumer verification system 234 may comprise any entity, system, service, or the like capable of verifying the consumer data. For example, consumer verification system 234 may include a provider of background check services, a consumer reporting agency, a consumer credit reporting company, a public database, and/or the like.

Provider verification system 236 may be configured to provide verification services for a security provider. Provider verification system 236 may provide the verification services during a provider registration, and/or at any other time during the lifecycle of a security provider's active registration. For example, provider verification system 236 may be configured to verify provider data, such as provider personal data (e.g., name, address, telephone number, employment data, etc.), provider employment data (e.g., employment status, government agency employed with, rank, etc.), security credentials (e.g., security experience, tenure, certifications, etc.), and/or the like. As used herein, verifying provider data may include verifying that the provider data is complete and/or accurate, providing background check services based on the provider data, verifying employment data or security credentials, and/or the like. Provider verification system 236 may comprise any entity, system, service, or the like capable of verifying the provider data. For example, provider verification system 236 may include a provider of background check services, a consumer reporting agency, a consumer credit reporting company, a public database, and/or the like. As a further example, provider verification system 236 may include a government agency (e.g., police department, fire station, etc.) capable of verifying employment status, security credentials, and/or the like.

Payment processing system 238 may be configured to receive, process, and complete security task payments received from security marketplace 140 (with brief reference to FIG. 1A). Payment processing system 238 may also be configured receive consumer payment information from security marketplace 140 (with brief reference to FIG. 1A), validate the consumer payment information, and return a consumer payment validation notification, as discussed further herein. Payment processing system 238 may comprise a typical payment processing system, a payment settling system, a bank, or the like, as discussed further herein.

In various embodiments, and with reference again to FIG. 1A, security marketplace 140 may be configured to provide various security marketplace services, as discussed further herein. For example, security marketplace 140 may be configured to provide registration services for security consumers and/or security providers. Security marketplace 140 may be configured to receive a security task from a security consumer and enable a security provider to complete the security task. Security marketplace 140 may be configured to process security task payments received in response to a security provider completing a security task. Security marketplace 140 may be configured to provide security provider reporting capabilities. Security marketplace 140 may also be configured to provide security task monitoring capabilities and technology, such as video streaming, location tracking, and/or the like.1

Security marketplace 140 may be in electronic communication with security consumer device 110, security provider device 120, and/or third party system 130. Security marketplace 140 may comprise any combination of hardware and/or software components. For example, security marketplace 140 may comprise hardware such as a processing unit, a communications unit, a memory unit, an input device, and/or an output device. Security marketplace 140 may also comprise software configured to manage and/or interact with the hardware components, such as, for example, an operating system, user interfaces, software applications, databases, and/or the like.

In various embodiments, security marketplace 140 may comprise at least one computing device in the form of a computer or processor, or a set of computers and/or processors, although other types of computing units or systems may be used, such as, for example, a server, a web server, a pooled server, an application server, a computer-based system, and/or the like. Security marketplace 140 may also include one or more data centers, cloud storages, or the like, and may include software, such as application programming interfaces (APIs), software development kits (SDKs), web services, executables, or the like configured to perform various operations, functions, and steps discussed herein. In various embodiments, security marketplace 140 may be computer based, and may comprise a processor, a tangible non-transitory computer-readable memory, and/or a network interface, along with other suitable system software and hardware components. Instructions stored on the tangible non-transitory memory may allow security marketplace 140 to perform various operations, functions, and/or steps, as described herein.

Figure 3:
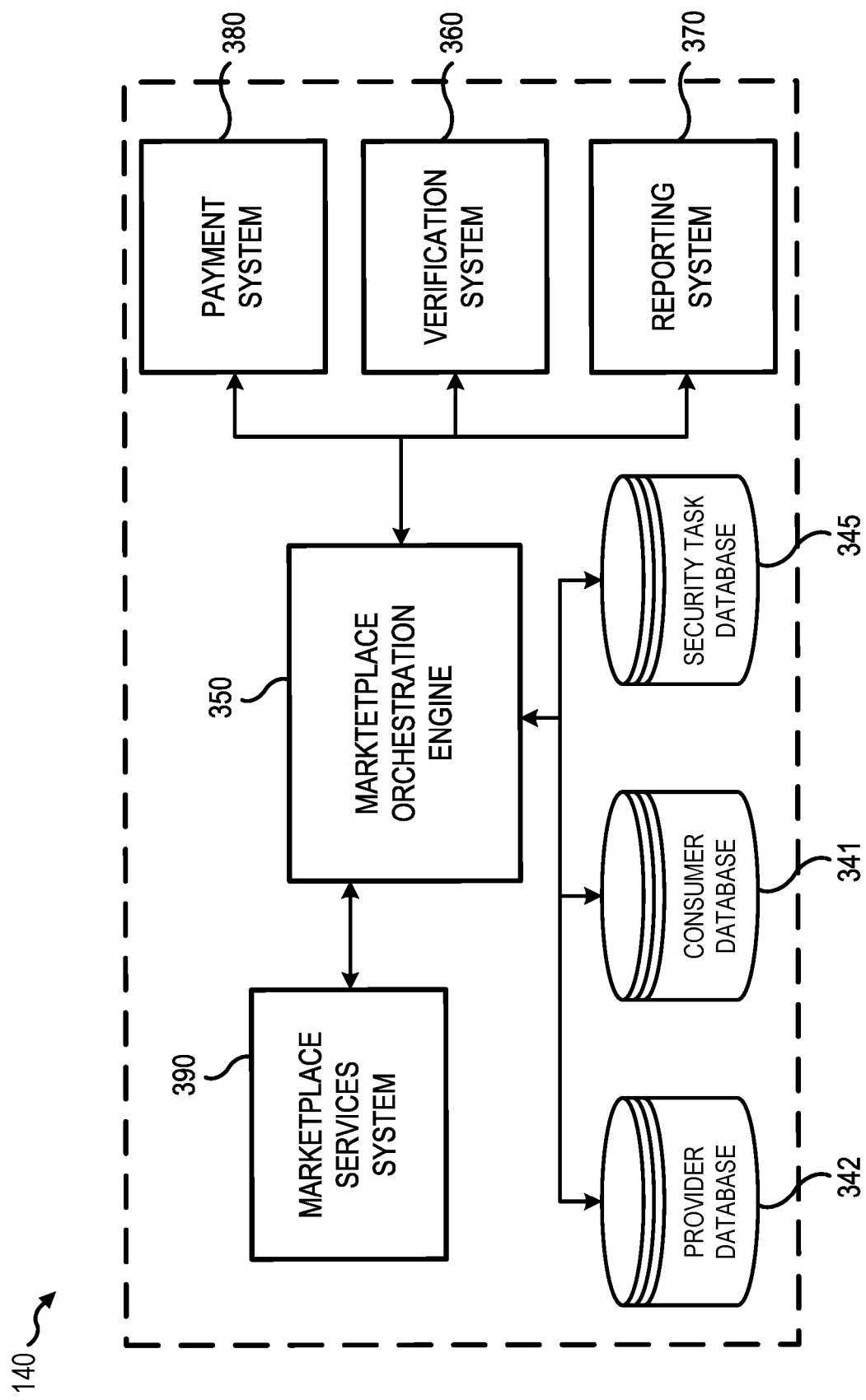
FIG. 3 is a block diagram of an exemplary security marketplace, in accordance with various embodiments.

Security marketplace 140 may comprise one or more hardware, software, and/or database components configured to perform various services, operations, functions, and/or steps, as described herein. For example, in accordance with various embodiments and with reference to FIG. 3, a security marketplace 140 may comprise one or more of a consumer database 341, a provider database 342, a security task database 345, a marketplace orchestration engine 350, a verification system 360, a reporting system 370, a payment system 380, and/or a marketplace services system 390.

Consumer database 341 may be configured to store and maintain consumer profiles. A consumer profile may be associated with a security consumer, and may be generated during a consumer registration process. The consumer profile may comprise a consumer identifier generated during the consumer registration process and configured to uniquely identify the consumer. The consumer profile may also comprise consumer data, consumer payment information, consumer tasks, and/or any other security consumer-based data. The consumer tasks may comprise a task identifier and a task status. The task identifier may be associated with a security task stored in security task database 345. The task status may indicate the current status of the security task associated with the task identifier (e.g., active, complete, etc.). The consumer profile may also comprise a consumer rating, provider feedback on the consumer, and/or the like. Consumer database 341 may store, maintain, and/or encrypt or protect the data using any suitable technique.

Provider database 342 may be configured to store and maintain provider profiles. A provider profile may be associated with a security provider, and may be generated during a provider registration process. The provider profile may comprise a provider identifier generated during the provider registration process and configured to uniquely identify the provider. The provider profile may also comprise provider data, a provider task policy, provider completed tasks (e.g., a task identifier, a task time, etc.), provider completed task time, and/or any other security provider-based data. The provider profile may also comprise a provider rating, consumer feedback on the provider, and/or the like. Provider database 342 may store, maintain, and/or encrypt or protect the data using any suitable technique.

Security task database 345 may be configured to store and maintain security task data (e.g., security tasks). The security task data may comprise a task identifier generated during creation of the security task. The security task data may also comprise a task status, a task type, a task description, a task location (e.g., venue, address, a geofence, etc.), a task requirement, a task allotted time (e.g., 2 hours, 3-6 hours, etc.), a task payout (e.g., $500.00, $50.00/hour, etc.), and/or any other security task-based data. A geofence may comprise or define a virtual perimeter associated with a real-world geographic area. A geofence may comprise a fixed radius around a point location or may comprise a predefined set of boundaries. The task requirement may comprise data requested by a security consumer during creation of the security task, such as, for example, requested security provider credentials (e.g., rank, tenure, certifications, unit, etc.), travel requirements, attire requirement (e.g., in uniform, casual clothes, etc.), video streaming request, and/or the like. The task type may be selectable from the system (e.g., via a drop-down box of available task types) or may be input by a security consumer. The task requirement may also comprise data or instructions of services to be performed during a security task, such as, for example, video and/or audio streaming, location tracking, or the like. Security task database 345 may store, maintain, and/or encrypt or protect the data using any suitable technique.

Marketplace orchestration engine 350 may be configured as a central orchestration means configured to transmit and receive data in security marketplace 140. For example, marketplace orchestration engine 350 may transmit and retrieve data from consumer database 341, provider database 342, and/or security task database 345. Marketplace orchestration engine 350 may also instruct, transmit data to, and receive data from verification system 360, reporting system 370, payment system 380, and/or marketplace services system 390, as discussed further herein.

Verification system 360 may be configured to provide verification services for consumer registrations and provider registrations. For example, in response to a security consumer or a security provider submitting a marketplace registration request, verification system 360 may be configured to communicate with a third party system 130 (with brief reference to FIGS. 1 and 2C) to verify the consumer data or provider data received from the marketplace registration request.

Reporting system 370 may be configured to provide reporting capabilities in security marketplace 140. For example, reporting system 370 may be configured to generate a security provider task report. The security provider task report may be generated in response to a security provider completing a security task and/or at a defined reporting time (e.g., daily, weekly, monthly, etc.). The security provider task report may be generated using any suitable technique, and may be generated or converted into in any desired format (e.g., XML file, world document, spreadsheet, email, text message, etc.). Reporting system 370 may transmit the security provider task report to a third party system 130 (with brief reference to FIGS. 1 and 2C) and/or to security provider device 110 (with brief reference to FIG. 1A).

Payment system 380 may be configured to process a security task payment. For example, payment system 380 may process a security task payment in response to a security provider completing a security task, or based on a defined payment time (e.g., payment at the end of each month). Payment system 380 may be configured to communicate with a third party system 130 (with brief reference to FIGS. 1 and 2C) to complete the processing of the payment.

Marketplace services system 390 may be configured to provide various services available through security marketplace 140. For example, marketplace services system 390 may be configured to provide video streaming services from a security provider device (e.g., an onboard camera, body camera, etc.) to a security consumer device. Marketplace services system 390 may provide the streaming services using any suitable protocol (e.g., Real-Time Messaging Protocol (RTMP), HTTP-based protocols, etc.), and including any compression or streaming techniques. Marketplace services system 390 may provide the streaming services in real-time or near real-time. As a further example, marketplace services system 390 may provide location services such as real-time tracking, GPS tracking, or the like. As a further example, marketplace services system 390 may provide services for the security provider device, such as, for example, activation of a CEW, or the like. As a further example, marketplace services system 390 may provide travel services for security tasks requiring travel (e.g., car, air, hotel, etc.). Marketplace services system 390 may communicate with, or redirect to, a third-party travel service (e.g., EXPEDIA®, TRAVELOCITY®, a public air travel booking platform, a private air travel booking platform, a hotel booking platform, etc.).

Referring now to FIGS. 4-9B the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 4-9B, but also to the various system components as described above with reference to FIGS. 1A-3.

Figure 4:
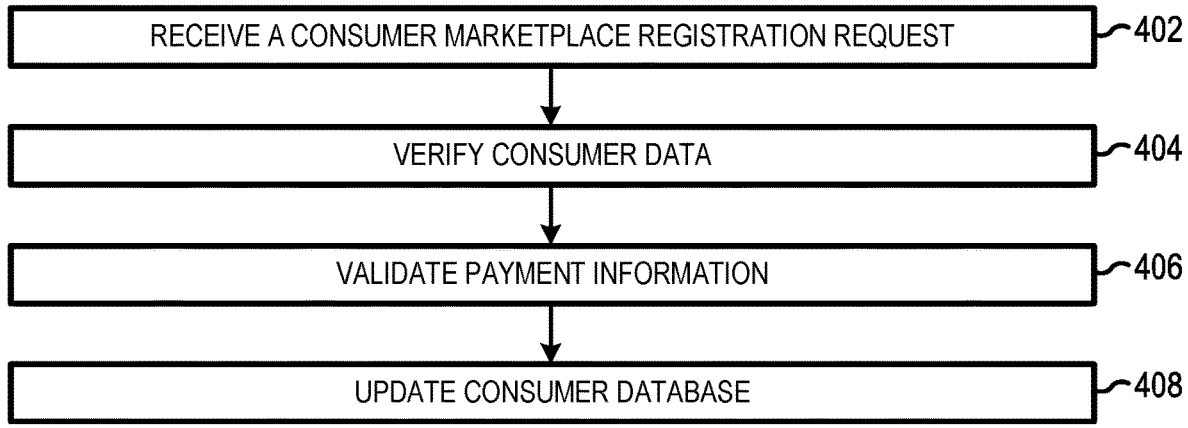
FIG. 4 illustrates a process flow for a method of registering a security consumer for a security marketplace, in accordance with various embodiments.

In various embodiments, and with specific reference to FIG. 4, a method 400 for registering a security consumer for a security marketplace is disclosed. The system may receive a consumer marketplace registration request (step 402). For example, a security consumer may interact with security consumer device 110 to transmit a consumer marketplace registration request to security marketplace 140 (e.g., via marketplace orchestration engine 350). The consumer marketplace registration request may comprise consumer data and/or consumer payment information. The consumer data may comprise data associated with the security consumer, such as, for example, name, company, title, company address, home address, contact phone number, etc. The consumer payment information may comprise data indicating a payment account that the security consumer desires to use to pay for security tasks, such as a checking account, a savings account, a credit card number, etc. The consumer payment information may comprise an account number, a routing number, a credit card number, an expiration date, and/or any other payment information. The consumer marketplace registration request may also comprise a username, a password, a biometric input, or the like.

The system may verify consumer data (step 404) from the consumer marketplace registration request. For example, security marketplace 140 (via marketplace orchestration engine 350 and/or verification system 360) may transmit the consumer data to a third party system 130. Third party system 130 may verify the consumer data using any suitable technique. In response, third party system 130 may transmit to security marketplace 140 a consumer verification notification. The consumer verification notification may comprise data indicating that the verification process passed or failed, or may provide a risk score or similar notifier of consumer worthiness.

The system may validate payment information (step 406) from the consumer marketplace registration request. For example, security marketplace 140 (via marketplace orchestration engine 350 and/or verification system 360 or payment system 380) may transmit the payment information to a third party system 130. Third party system 130 may validate the payment information using any suitable technique. In response, third party system 130 may transmit to security marketplace 140 a consumer payment validation notification. The consumer payment validation notification may comprise data indicating that the validation process passed or failed. In response to the payment information failing validation, security marketplace 140 may prompt security consumer device 110 to reenter payment information or to select another form of payment.

In response to verifying the consumer data and/or validating the payment information, the system may update the consumer database (step 408) to complete the consumer marketplace registration request. For example, security marketplace 140 (via marketplace orchestration engine 350) may generate a consumer profile. The consumer profile may comprise a consumer identifier configured to uniquely identify the security consumer. The consumer profile may comprise the consumer data (or a portion of the consumer data) and the payment information. Security marketplace 140 (via marketplace orchestration engine 350) may store the consumer profile in consumer database 341. In response to updating the consumer database, the system may return to the security consumer a registration success notification.

Figure 5:
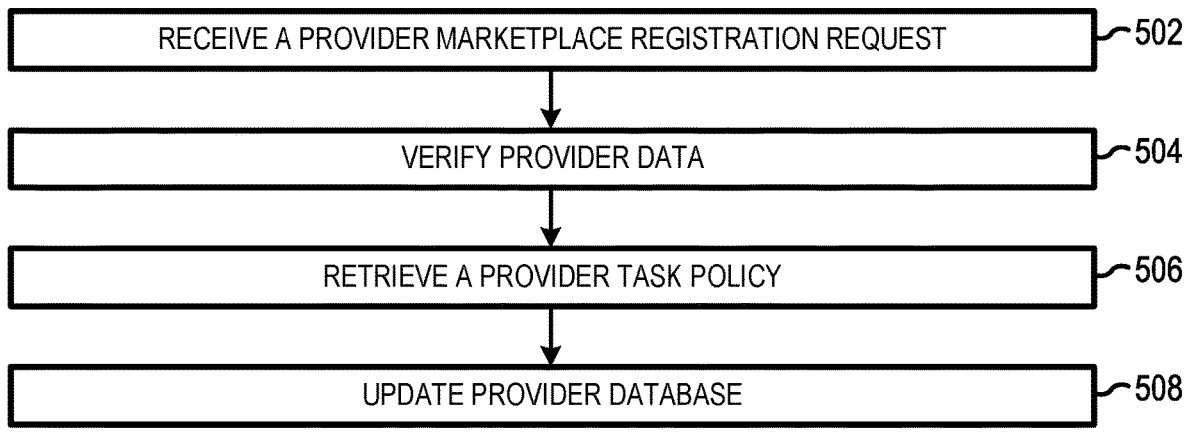
FIG. 5 illustrates a process flow for a method of registering a security provider for a security marketplace, in accordance with various embodiments.

In various embodiments, and with specific reference to FIG. 5, a method 500 for registering a security provider for a security marketplace is disclosed. The system may receive a provider marketplace registration request (step 502). For example, a security provider may interact with security provider device 120 to transmit a provider marketplace registration request to security marketplace 140 (e.g., via marketplace orchestration engine 350). The provider marketplace registration request may comprise provider data. Provider data may comprise provider personal data (e.g., name, address, telephone number, employment data, etc.), provider employment data (e.g., employment status, government agency employed with, rank, etc.), security credentials (e.g., security experience, tenure, certifications, etc.), and/or the like. The provider marketplace registration request may also comprise a provider payment account. The provider payment account may comprise data associated with the bank account (e.g., checking account, savings account, etc.) that the provider desires security task payments to be transmitted to. The provider marketplace registration request may also comprise a username, a password, a biometric input, or the like. The provider marketplace registration request may also comprise data regarding secondary security provider devices used by or associated with the security provider, such as a device type (e.g., body worn camera, CEW, surveillance camera, etc.), a device identifier (e.g., unique identifier associated with the secondary security provider device), and/or the like.

The system may verify provider data (step 504) from the provider marketplace registration request. For example, security marketplace 140 (via marketplace orchestration engine 350 and/or verification system 360) may transmit the provider data to (one or more) third party system 130. Third party system 130 may verify the provider data using any suitable technique. In response, third party system 130 may transmit to security marketplace 140 a provider verification notification. The provider verification notification may comprise data indicating that the verification process passed or failed. In response to the provider verification failing, the provider verification notification may also comprise data indicating the provider data that was unable to be verified, or that failed the verification process. In various embodiments, the system may also validate the provider payment account. The system may validate the provider payment account using a similar process to that described in step 406 of FIG. 4.

The system may retrieve a provider task policy (step 506). The provider task policy may be provided with the provider marketplace registration request. Security marketplace 130 (via marketplace orchestration engine 350) may also communicate with a third party system 130 (e.g., a police department, government authority, etc.) to retrieve the task policy.

In response to verifying the provider data and/or retrieving the task policy, the system may update the provider database (step 508) to complete the provider marketplace registration request. For example, security marketplace 140 (via marketplace orchestration engine 350) may generate a provider profile. The provider profile may comprise a provider identifier configured to uniquely identify the security provider. The provider profile may comprise the provider data (or a portion of the provider data), the provider payment account, and/or the task policy. Security marketplace 140 (via marketplace orchestration engine 350) may store the provider profile in provider database 342. In response to updating the provider database, the system may return to the security provider a registration success notification.

Figure 6:
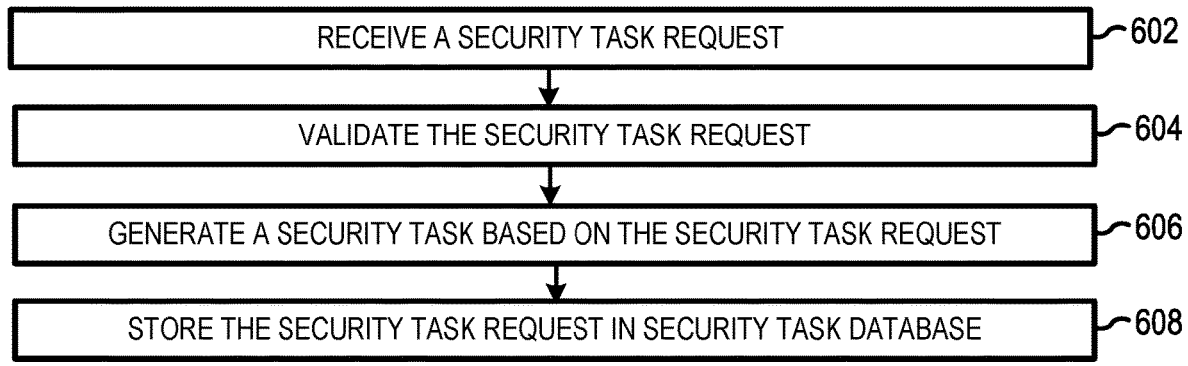
FIG. 6 illustrates a process flow for a method of generating a security task, in accordance with various embodiments.

In various embodiments, and with specific reference to FIG. 6, a method 600 for generating a security task is disclosed. The system may receive a security task request (step 602). For example, security marketplace 140 (via marketplace orchestration engine 350) may receive the security task request from security consumer device 110. The security task request may comprise a task type (e.g., venue security, travel security, personal security, etc.), a task description, a task location (e.g., venue, address, a geofence, etc.), a task requirement, a task allotted time (e.g., 2 hours, 3-6 hours, etc.), a task payout (e.g., $500.00, $50.00/hour, etc.), and/or any other security task-based data. The task requirement may comprise requirements input by the security consumer, such as, for example, requested security provider credentials, travel requirements, attire requirements, video streaming request (e.g., request to provide video data), audio streaming request (e.g., request to provide audio data), location tracking, and/or the like. The task payout may be input by the security consumer. In various embodiments, the task payout may be selectable based on task type or task requirements (e.g., payout tiers based on the task types and/or task requirements).

In response to receiving the security task request, the system may validate the security task request (step 604). Security marketplace 140 (via marketplace orchestration engine 350) may be configured to validate the security task request. For example, security marketplace 140 may communicate with consumer database 341 to verify that the security consumer transmitting the request comprises a consumer profile and/or is in good standing. Security marketplace 140 may also validate the security task request by verifying that the security task request comprises all required inputs.

The system may generate a security task based on the security task request (step 606). Security marketplace 140 (via marketplace orchestration engine 350) may be configured to generate the security task based on the security task request. Security marketplace 140 may generate and assign a task identifier to uniquely identify the security task. The security task may comprise the consumer identifier associated with the security consumer transmitting the request. The security task may comprise the task status, the task type, the task description, the task location, the task requirement, the task allotted time, and/or any other security task-based data from the security task request.

The system may store the security task in the security task database (step 608). Security marketplace 140 (via marketplace orchestration engine 350) may be configured to store the security task in security task database 345.

Figure 7:
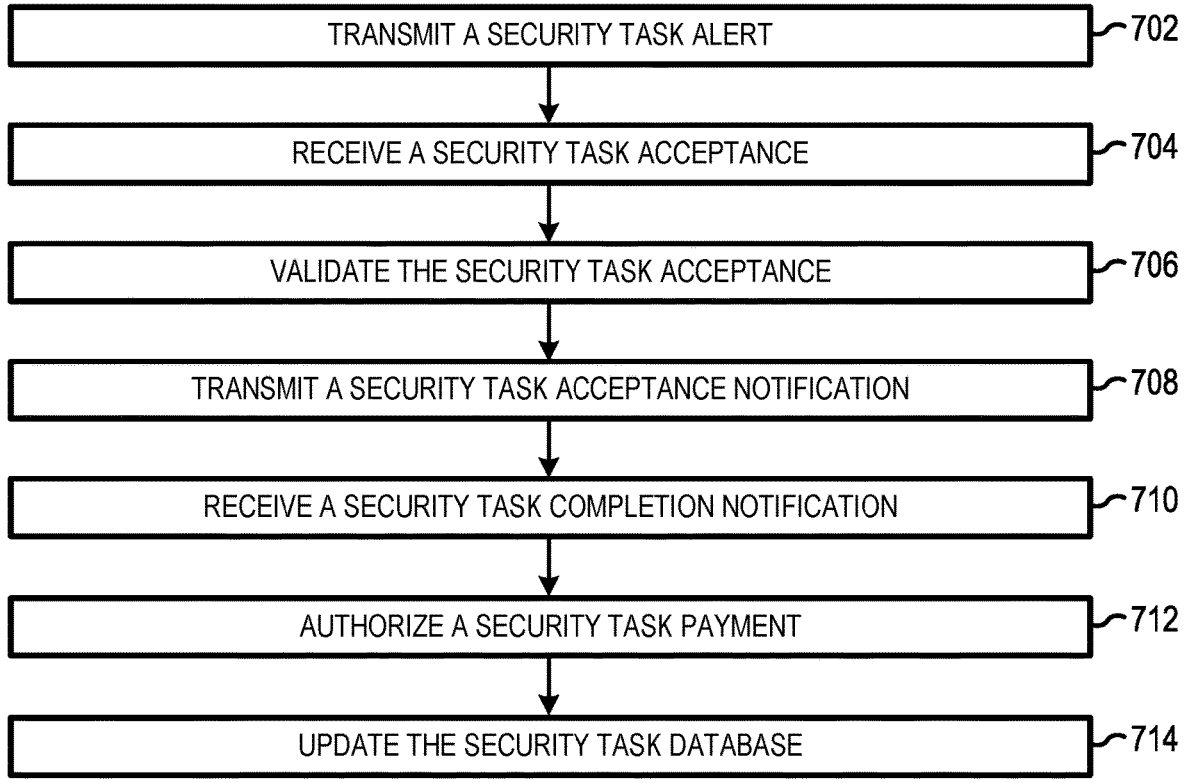
FIG. 7 illustrates a process flow for a method of completing a security task, in accordance with various embodiments.

In various embodiments, and with specific reference to FIG. 7, a method 700 for completing a security task is disclosed. The system may transmit a security task alert (step 702). The system may transmit the security task alert in response to the security task being generated and/or stored. The system may transmit the security task alert based on a predefined alert time (e.g., once an hour, once a day, etc.). The system may transmit the security task alert to a security provider. For example, the system may directly transmit the security task alert to a security provider via email, text message, or the like. The system may also transmit the security task alert by providing the security task alert on a task board or similar web-based or mobile app-based portal configured to provide information on one or more security task alerts to security providers.

The security task alert may also be transmitted to one or security providers based on a match between a provider profile and the security task. The system may transmit the security task alert to a third party system (e.g., police department, government authority, etc.) having a security provider registered with the system. In that regard, the third party system may control who the security task is assigned to (e.g., based on tenure, randomized, fixed rotation, by unit, etc.). Security marketplace 140 (via marketplace orchestration engine 350) may be configured to generate and transmit the security task alert. For example, the security task alert may be transmitted to security provider device 120. The security task alert may comprise data indicating a security task is available. The security task alert may also comprise data associated with the security task, such as, for example, the task identifier, the task type, the task description, or the like.

The system may receive a security task acceptance (step 704). Security marketplace 140 (via marketplace orchestration engine 350) may be configured to receive the security task acceptance from a security provider device 120. For example, a security provider may interact with security provider device 120 to accept a security task in response to receiving the security task alert. The security provider, via security provider device 120, may also browse security marketplace 140 (via marketplace orchestration engine 350 and security task database 345) to view available security tasks. The security task acceptance may comprise the task identifier and the provider identifier of the security provider accepting the security task.

The system may validate the security task acceptance (step 706). Security marketplace 140 (via marketplace orchestration engine 350) may be configured to validate the security task acceptance. For example, security marketplace 140 may validate the security task acceptance based on comparison of the provider profile and task policy. Security marketplace 140 (via marketplace orchestration engine 350 and provider database 342) may retrieve the provider profile (based on provider identifier). Security marketplace 140 may compare the provider completed task time (e.g., the total time spent completing security tasks) to the task policy to determine whether the security provider may complete the security task without violating the task policy. Validation may also include transmitting the security task acceptance to the security consumer (based on consumer identifier), and requiring affirmation from the security consumer. In that regard, the security consumer may decide to deny the security task acceptance, and reopen the security task to a different security provider. In response to the security consumer receiving a plurality of security task acceptances, the security consumer may select one (or more) of the security task acceptances to proceed with.

In response to validating the security task acceptance, the system may transmit a security task acceptance notification (step 708). The system may transmit the security task acceptance notification to the security consumer and the security provider. For example, security marketplace 140 (via marketplace orchestration engine 350) may be configured to transmit the security task acceptance notification to security consumer device 110 and security provider device 120 (and/or third party 130 associated with the security provider). The security task acceptance notification may comprise consumer data and provider data to enable communication between the parties. Security marketplace 140 (via marketplace orchestration engine 350) may update the security task in security task database 345 as assigned to the security provider. Security marketplace 140 (via marketplace orchestration engine 350) may also update consumer database 341 and/or provider database 342 to reflect the assignment.

During completion of the security task, or before completion of the security task, security marketplace 140 (via marketplace services system 390) may be configured to provide marketplaces services based on the requirements of the security task. For example, in response to the security task requiring video streaming capabilities, security marketplace 140 (via marketplace services system 390) may provide video streaming services to enable video to be streamed from security provider device 120 to security consumer device 110. As a further example, in response to the security task requiring travel, security marketplace 140 (via marketplace services system 390) may provide travel services to the security consumer and/or security provider to book the travel.

For example, and in accordance with various embodiments, a marketplace service may comprise a video and/or audio request, a location tracking request, and/or the like. The marketplace service may be provided based on task requirements, as discussed further herein. For example, in response to a task requirement comprising a video streaming request, security marketplace 140 may be configured to provide video services during completion of the security task. Security marketplace 140 may be configured to provide the marketplace service using any suitable process or technique.

Figure 9A:
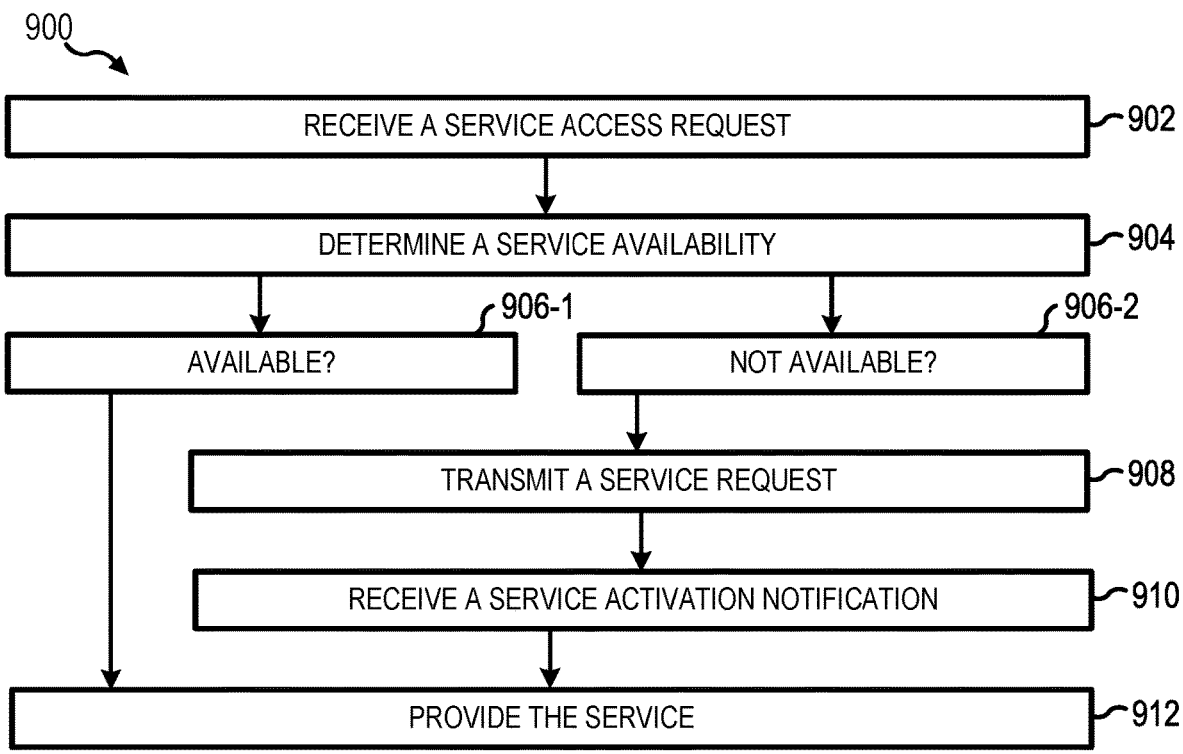
FIG. 9A illustrates a process flow for a method for consumer activation of a security provider device, in accordance with various embodiments.

For example, in accordance with various embodiments and with reference to FIG. 9A, a method 900 for a consumer activation of a security provider device is disclosed. The system may receive a service access request (step 902). Security marketplace 140 may be configured to receive the service access request. The service access request may be transmitted to the system by a security consumer device (e.g., security consumer device 110). The service access request may comprise data indicating a marketplace service that a security consumer desires to consume, activate, and/or receive (e.g., via security consumer device 110). For example, the service access request may comprise the task identifier and a marketplace service selection, such as a video request, an audio request, a location tracking request, and/or the like.

The system may determine a service availability (step 904). Security marketplace 140 may be configured to determine the service availability. The system may determine the service availability using any suitable technique. For example, the system may determine whether the service is available (step 906-1) or not available (step 906-2). Determining whether the service is available or not available may include determining whether a security provider device is already providing the service to security marketplace 140 (e.g., security provider device 120 is already transmitting or otherwise providing video, audio, location information, or the like to security marketplace 140).

In response to the system determining that the service is not available (step 906-2), the system may transmit a service request (step 908). Security marketplace 140 may be configured to transmit the service request to a security provider device (e.g., a security provider device 120). The service request may comprise data or instructions to the security provider device to provide the marketplace service selection. For example, in response to the marketplace service selection comprising a video service, the service request may comprise instructions to the security provider device to begin recording video and transmit the video to the system (e.g., security marketplace 140 and/or directly to security consumer device 110).

In response to receiving the service request, the security provider device may activate a corresponding service. For example, the security provider device may begin recording audio and/or video, providing location information, or the like. In various embodiments, the security provider device may also prompt a security provider to confirm or accept activation of the service, prior to activating the service. In response to beginning recording audio and/or video, providing location information, or the like, the security provider device may transmit a service activation notification to the system.

In various embodiments, in response to the security provider also including a secondary security provider device (e.g., secondary security provider device 122-1), the security provider device may instruct the secondary security provider device to begin recording audio and/or video, providing location information, or the like. In response to receiving the instruction, the secondary security provider device may begin recording audio and/or video, providing location information, or the like. The secondary security provider device may transmit a service activation notification to the system (e.g., directly or via the security provider device).

The system may receive a service activation notification (step 910). Security marketplace 140 and/or security consumer device 110 may receive the service activation notification. The service activation notification may comprise data indicating that the service is being provided. The service activation notification may also comprise data or metadata associated with the service activation, such as, for example, a date and time of activation, a location information associated with the activation, a unique identifier associated with the security provider device providing the service, and/or the like.

The system may provide the service (step 912). The system may provide the service in response to determining that the system is available (step 906-1) or in response to receiving the service activation (step 910) from the security provider device. For example, a security provider device (or a secondary provider device) may provide the service directly to the security consumer device. As a further example, the security provider device (or the secondary provider device) may provide the service to the security marketplace. The security marketplace may provide the service directly to the security consumer device. The security marketplace may also store data (e.g., service data)

regarding the service (e.g., audio file, video file, location information file, etc.). The security marketplace may associate the service data with the security task, the service activation notification, and/or any other data received or ingested by the security marketplace. In various embodiments, providing the service may comprise a tangible outcome caused by the service access request (e.g., activation of a microphone or camera, activation of a GPS or similar location device, etc.).

Figure 9B:
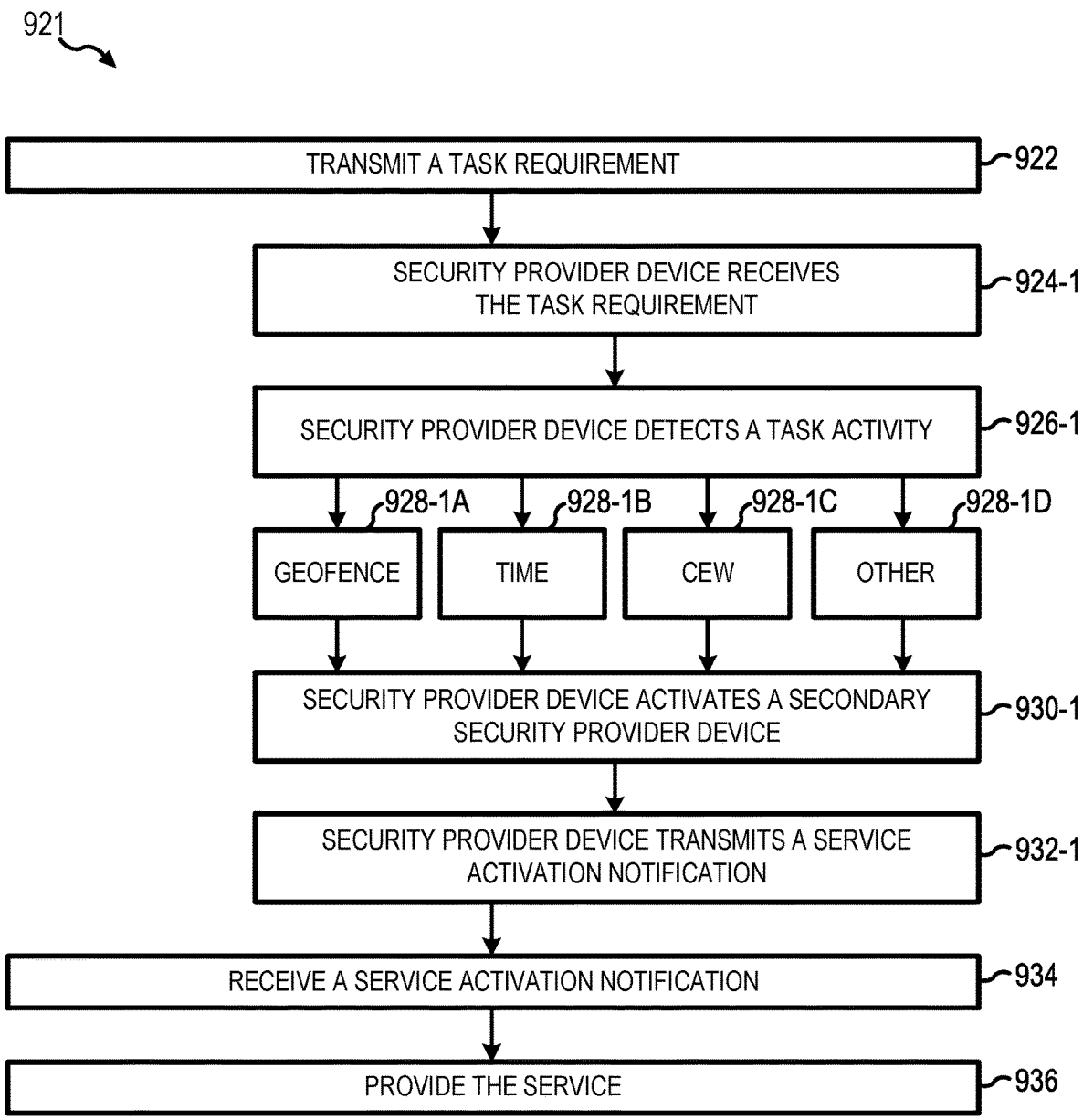
FIG. 9B illustrates a process flow for a method for task activation of a security provider device, in accordance with various embodiments.

As a further example, in accordance with various embodiments and with reference to FIG. 9B, a method 921 for a task activation of a security provider device is disclosed. The system may transmit a task requirement (step 922). For example, the task requirement may be transmitted together with transmitting a security task alert (e.g., step 702, with brief reference to FIG. 7), and/or separately or combined with any other process or step. Security marketplace 140 may be configured to transmit the task requirement to security provider device 120.

A security provider device (e.g., security provider device 120) may receive the task requirement (step 924-1). The task requirement (e.g., service task requirement) may comprise data and/or instructions that cause the security provider device to perform operations based on the detection of a task activity. For example, the task requirement may comprise data/or instructions that cause the security provider device to (directly or indirectly) provide a service (e.g., audio, video, location information, etc.) in response to detecting that the security provider device is within a geofence location, the security provider device has a device time and/or date matching a security task time and/or date, a CEW in electronic communication with the security provider device has activation, and/or any other type of detection (e.g., activation of a surveillance alarm, occurrence of an event, increase in heart rate of the security provider, etc.). Providing the service may comprise a tangible outcome caused by the detection (e.g., activation of a microphone or camera, activation of a GPS or similar location device, etc.).

The security provider device may detect a task activity (step 926-1). For example, detecting the task activity may include detecting a geofence (step 928-1A), a time (step 928-1B), a CEW activation (step 928-1C), and/or an other detection (step 928-1D). The security provider device may be configured to detect the task activity using any suitable method. The security provider device may also be configured to detect a plurality of task activities. For example, detecting a geofence (step 928-1A) may include comparing location information of the security provider device against the geofence data to determine whether the security provider device is within the geofence. Detecting a time (step 928-1B) may include comparing a local time and/or date provided by the security provider device against the time data to determine whether the time and/or date of the security provider device is equal to or greater than the time data. Detecting a CEW activation (step 928-1C) may include the security provider device receiving an activation signal that the CEW was activated, withdrawn from its holster, or the like. The security provider device may detect an other detection (step 928-1D) using any similarly suitable process.

In various embodiments, in response to detecting the task activity, the security provider device may activate a corresponding service provided by the security provider device. For example, the security provider device may begin recording audio and/or video, providing location information, or the like. In various embodiments, the security provider device may also prompt a security provider to confirm or accept activation of the service, prior to activating the service. In response to beginning recording audio and/or video, providing location information, or the like, the security provider device may transmit a service activation notification to the system.

In various embodiments, in response to detecting the task activity the security provider device may activate a secondary security provider device (e.g., secondary security provider device 122-1) (step 930-1). The security provider device may be in electronic communication with the secondary security provider device. The security provider device may activate the secondary security provider device using any suitable method or process. For example, the security provider device may transmit an activation instruction to the secondary security provider device. The activation instruction may comprise instructions to activate a service. In response to receiving the activation instruction, the secondary security provider device may activate the corresponding service. For example, in response to receiving the activation instruction, the secondary security provider device may begin recording audio and/or video, providing location information, or the like. The secondary security provider device may transmit a service activation notification to the system (e.g., directly or via the security provider device).

The security provider device may transmit the service activation notification (step 932-1), as previously discussed.

The system may receive a service activation notification (step 934). Security marketplace 140 and/or security consumer device 110 may receive the service activation notification. The service activation notification may comprise data indicating that the service is being provided. The service activation notification may also comprise data or metadata associated with the service activation, such as, for example, a date and time of activation, a location information associated with the activation, a unique identifier associated with the security provider device providing the service, an event causing the activation (e.g., geofence, date time, CEW activation, etc.), and/or the like.

The system may provide the service (step 936). The system may provide the service in response to activating the security provider device, activating the secondary security provider device, and/or in response to receiving the service activation (step 934). For example, a security provider device (or a secondary provider device) may provide the service directly to the security consumer device. As a further example, the security provider device (or the secondary provider device) may provide the service to the security marketplace. The security marketplace may provide the service directly to the security consumer device. The security marketplace may also store data (e.g., service data) regarding the service (e.g., audio file, video file, location information file, etc.). The security marketplace may associate the service data with the security task, the service activation notification, and/or any other data received or ingested by the security marketplace. In various embodiments, providing the service may comprise a tangible outcome caused by the service access request (e.g., activation of a microphone or camera, activation of a GPS or similar location device, etc.).

With reference again to FIG. 7, the system may receive a security task completion notification (step 710) in response to the security task being completed. For example, security marketplace 140 (via marketplace orchestration system 350) may receive the security task completion notification from security consumer device 110 and/or security provider device 120. The security task completion notification may comprise the task identifier, data indicating the security task was completed, a consumer feedback about the security provider (e.g., provider rating, remarks, etc.), a provider feedback about the security consumer (e.g., consumer rating, remarks, etc.). Security marketplace 140 (via marketplace orchestration system 350) may update the consumer profile in consumer database 341 to reflect the provider feedback. Security marketplace 140 (via marketplace orchestration system 350) may update the provider profile in provider database 342 to reflect the provider feedback.

In response to receiving the security task completion notification, the system may authorize a security task payment (step 712). The security task payment may be based on the task payout specified in the security task. Security marketplace 140 (via marketplace orchestration system 350 and payment system 380) may be configured to authorize the security task payment. For example, security marketplace 140 may retrieve the consumer payment information and the provider payment account (e.g., via consumer database 341 and/or provider database 342). Security marketplace 140 may communicate with one or more third party systems 130 to authorize and initiate payment from the consumer account to the provider account. Third party system 130 may complete the payment using any suitable technique and return a payment notification in response to completing the payment.

The system may update the security task database (step 714). Security marketplace 140 (via marketplace orchestration system 350) may update the consumer profile in consumer database 341 to reflect the provider feedback, the security task completion, and the payout authorized. Security marketplace 140 (via marketplace orchestration system 350) may update the provider profile in provider database 342 to reflect the provider feedback, the security task completion, and the payment authorized. Security marketplace 140 (via marketplace orchestration system 350) may update security task database 345 to mark the security task as completed.

Figure 8:
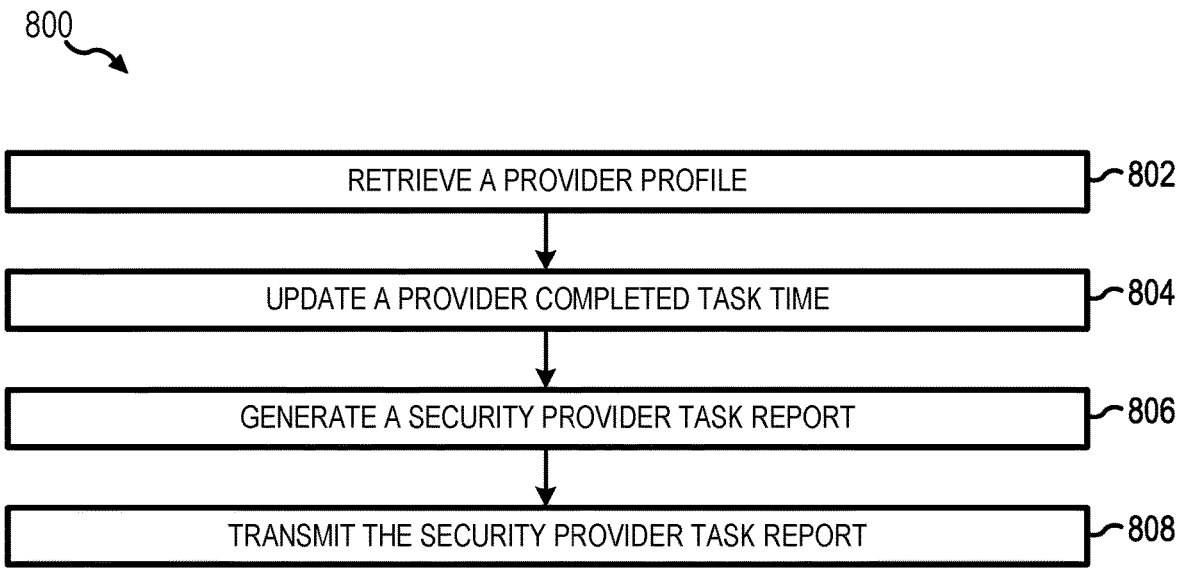
FIG. 8 illustrates a process flow for a method of generating a security provider task report, in accordance with various embodiments.

In various embodiments, and with specific reference to FIG. 8, a method 800 for generating a security provider task report is disclosed. The system may retrieve a provider profile (step 802) based on the security task completion notification. For example, security marketplace 140 (via marketplace orchestration system 350) may retrieve the provider profile from provider database 342 based on the provider identifier.

The system may update a provider completed task time (step 804) from the provider profile. Security marketplace 140 (via marketplace orchestration system 350) may update the provider completed task time in the provider profile. The provider completed task time may be based on the task time from the security task. The provider completed task time may be updated to reflect the number of hours the security provider has spent completing security tasks, post-security task completion notification.

The system may generate a security provider task report (step 806). The security provider task report may comprise provider data indicating the identity of the security provider and the provider completed task time. Security marketplace 140 (via marketplace orchestration system 350 and/or reporting system 370) may be configured to generate the security provider task report.

In response to generating the security provider task report, the system may transmit the security provider task report (step 808). Security marketplace 140 (via marketplace orchestration system 350 and/or reporting system 370) may be configured to transmit the security provider task report. The security provider task report may be transmitted to security provider device 120. The security provider task report may be transmitted to a third party system 130 associated with the security provider (e.g., police department, government authority, etc.).

Figure 10:
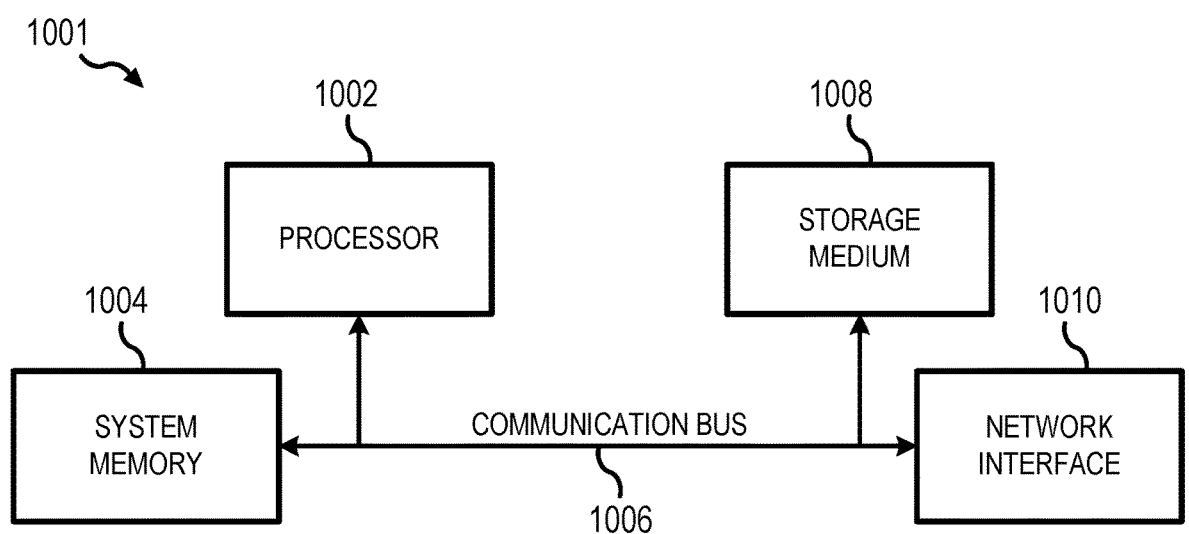
FIG. 10 is a block diagram illustrating components of a computer-based system, in accordance with various embodiments.

In various embodiments, and with reference to FIG. 10, an exemplary computer-based system 1001 is disclosed. Computer-based system 1001 may be appropriate for use in accordance with embodiments of the present disclosure. The accompanying description of computer-based system 1001 may be applicable to servers, personal computers, mobile phones, smart phones, tablet computers, embedded computing devices, and other currently available or yet-to-be-developed devices that may be used in accordance with embodiments of the present disclosure.

Computer-based system 1001 may include a processor 1002 and a system memory 1004 connected by a communication bus 1006. Depending on the exact configuration and type of computer-based system, system memory 1004 may be volatile or nonvolatile memory, such as read only memory ("ROM"), random access memory ("RAM"), EEPROM, flash memory, or other memory technology. Those of ordinary skill in the art and others will recognize that system memory 1004 typically stores data and/or program modules that are immediately accessible to and/or currently being operated on by processor 1002. In this regard, processor 1002 may serve as a computational center of computer-based system 1001 by supporting the execution of instructions. Processor 1002 may comprise one or more processing units, as discussed further herein. System memory 1004 may comprise one or more memory units, as discussed further herein.

Computer-based system 1001 may include a network interface 1010 comprising one or more components for communicating with other devices and systems over a network. Embodiments of the present disclosure may access basic services that utilize network interface 1010 to perform communications using common network protocols. Network interface 1010 may comprise a communications unit, as discussed further herein.

Computer-based system 1001 may also include a storage medium 1008. However, services may be accessed using a computer-based system that does not include means for persisting data to a local storage medium. Therefore, storage medium 1008 depicted in FIG. 10 is optional. Storage medium 1008 may be volatile or nonvolatile, removable or nonremovable, implemented using any technology capable of storing information such as, but not limited to, a hard drive, solid state drive, CD-ROM, DVD, BLU-RAY®, or other disk storage, magnetic tape, magnetic disk storage, and/or the like. Storage medium 1008 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 1004 and storage medium 1008 depicted in FIG. 10 are examples of computer-readable media.

For ease of illustration and because it is not important for an understanding of the claimed subject matter, FIG. 10 does not show some of the typical components of many computer-based systems. In this regard, computer-based system 1001 may include input devices, such as a keyboard, keypad, mouse, trackball, microphone, video camera, touchpad, touchscreen, electronic pen, stylus, and/or any other input device described herein. Such input devices may be coupled to computer-based system 1001 by wired or wireless connections including RF, infrared, serial, parallel, BLUETOOTH®, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computer-based system 1001 (e.g., a client device), or can be integral components of computer-based system 1001. In some embodiments, multiple input devices may be combined into a single, multifunction input device (e.g., a video camera with an integrated microphone).

Computer-based system 1001 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computer-based system 1001, or can be integral components of computer-based system 1001. Input functionality and output functionality may be integrated into the same input/output device (e.g., a touchscreen). Any suitable input device, output device, or combined input/output device either currently known or developed in the future may be used with described systems.

In various embodiments, a "processing unit" as described herein may comprising any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable electronic communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Any database discussed herein may include relational, hierarchical, graphical, distributed ledger, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables.

Each record stored in a database may be a single file, a series of files, a linked series of data fields, and/or any other data structure or schema.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by at least one processor of a computer-based system in electronic communication with a security provider device, a security task acceptance associated with a security task;
validating, by the at least one processor of the computer-based system, the security task acceptance; and
transmitting, by the at least one processor of the computer-based system, a security task acceptance notification to a security consumer device in response to validating the security task acceptance.

2. The method of claim 1, wherein the security task acceptance includes a task identifier and a provider identifier of a security provider accepting the security task.

3. The method of claim 1, wherein validating the security task acceptance includes comparing, by the at least one processor of the computer-based system, a provider profile associated with the security task acceptance and a task policy.

4. The method of claim 1, further comprising transmitting, by the at least one processor of the computer-based system, a security task alert.

5. The method of claim 1, further comprising:
receiving, by the at least one processor of the computer-based system, a security task completion notification from the security provider device; and
transmitting, by the at least one processor of the computer-based system, a security provider task report.

6. The method of claim 1, wherein the security task acceptance notification includes consumer data and provider data to enable communication between the security provider device and the security consumer device.

7. A system comprising:
- at least one processor; and
- a tangible, non-transitory memory configured to communicate with the at least one processor, the tangible, non-transitory memory having instructions stored thereon that, in response to execution by the at least one processor, cause the at least one processor to perform operations comprising:
  - receiving a security task acceptance from a security provider device, the security task acceptance associated with a security task;
  - validating the security task acceptance; and
  - transmitting a security task acceptance notification in response to validating the security task acceptance.

8. The system of claim 7, wherein the security task acceptance includes a task identifier of the security task and a provider identifier.

9. The system of claim 7, wherein validating the security task acceptance includes comparing a task time of the security task, a provider profile, and a task policy associated with the provider policy.

10. The system of claim 7, wherein validating the security task acceptance includes transmitting a plurality of security task acceptances to the security consumer device and receiving selection of one security task acceptance of the plurality of security task acceptances from the security consumer device.

11. The system of claim 7, wherein the operations further comprise transmitting a security task alert to the security provider device.

12. The system of claim 7, wherein the operations further comprise receiving a security task completion notification from the security provider device.

13. The system of claim 7, wherein the operations further comprise transmitting a security provider task report including a provider identifier associated with the security task acceptance.

14. The system of claim 7, wherein the operations further comprise:
- transmitting a task activity to the security provider device, wherein in response to the security provider device detecting a task activity during the security task, the security provider device is configured to capture at least one of audio data, video data, and location information;
- receiving the at least one of the audio data, the video data, and the location information from the security provider device.

15. An article of manufacture including a non-transitory, tangible computer readable storage medium having instructions stored thereon that, in response to execution by at least one processor, cause the at least one processor to perform operations comprising:
- receiving a security task acceptance associated with a security task and a provider identifier;
- validating the security task acceptance; and
- transmitting a security task acceptance notification in response to validating the security task acceptance.

16. The article of manufacture of claim 15, wherein validating the security task acceptance includes retrieving a provider profile associated with the provider identifier, retrieving a task policy associated with the provider identifier, and comparing the provider profile and the task policy.

17. The article of manufacture of claim 15, wherein the operations further comprise providing video streaming services to enable video to be streamed from the security provider device associated with the security task acceptance to a security consumer device associated with the security task.

18. The article of manufacture of claim 15, wherein the operations further comprise receiving provider data associated with the provider identifier and verifying the provider data.

19. The article of manufacture of claim 15, wherein the operations further comprise receiving a security task completion notification and updating a provider profile associated with the provider identifier in response to receiving the security task completion notification.

20. The article of manufacture of claim 15, wherein the operations further comprise generating a security provider task report including the provider identifier and a task time associated with the security task acceptance.

* * * * *